United States Patent
Feinstein

(10) Patent No.: US 10,343,499 B2
(45) Date of Patent: Jul. 9, 2019

(54) SUN VISOR SYSTEM

(71) Applicant: Ellen Feinstein, Creve Coeur, MO (US)

(72) Inventor: Ellen Feinstein, Creve Coeur, MO (US)

(*) Notice: Subject to any disclaimer, the term of this patent is extended or adjusted under 35 U.S.C. 154(b) by 0 days.

(21) Appl. No.: 15/801,997

(22) Filed: Nov. 2, 2017

(65) Prior Publication Data
US 2019/0126729 A1    May 2, 2019

(51) Int. Cl.
*B60J 3/02* (2006.01)

(52) U.S. Cl.
CPC ........... *B60J 3/0208* (2013.01); *B60J 3/0234* (2013.01)

(58) Field of Classification Search
CPC ............................. B60J 3/0208; B60J 3/0234
USPC ................................................ 296/97.6, 97.8
See application file for complete search history.

(56) References Cited

U.S. PATENT DOCUMENTS

| | | | | |
|---|---|---|---|---|
| 3,410,602 A * | 11/1968 | Schuler | ................. | B60J 3/0208 248/683 |
| 3,853,370 A * | 12/1974 | Barnhart | ................. | B60J 3/0208 296/97.6 |
| 3,948,554 A * | 4/1976 | Barbee | ................. | B60J 3/0208 296/97.6 |
| 4,023,854 A * | 5/1977 | Nack, Jr. | ................. | B60J 3/0208 24/561 |
| 4,090,732 A * | 5/1978 | Vistitsky | ................. | B60J 3/0208 296/97.11 |
| 4,792,176 A | 12/1988 | Karford | | |
| 5,016,938 A * | 5/1991 | Tschan | ................. | B60J 3/0208 296/97.8 |
| 5,259,657 A * | 11/1993 | Arendt | ................. | B60J 3/0208 224/312 |
| 5,466,029 A | 11/1995 | Zetterlund | | |
| 5,470,122 A * | 11/1995 | Feng | ................. | B60J 3/0208 296/97.11 |
| 5,662,371 A | 9/1997 | Gera et al. | | |
| D398,893 S | 9/1998 | Lyons | | |
| 5,842,748 A | 12/1998 | Cummins | | |
| D431,805 S | 10/2000 | Baltazar | | |
| 6,139,084 A | 10/2000 | Miles | | |
| 6,325,443 B1 * | 12/2001 | Sanchez | ................. | B60J 3/0208 296/97.6 |
| 6,616,209 B1 * | 9/2003 | Muyo | ................. | B60J 3/0208 296/97.4 |
| 7,540,553 B1 * | 6/2009 | Mullis | ................. | B60J 3/0208 296/97.11 |
| 8,540,301 B2 | 9/2013 | Watase | | |
| 2002/0130530 A1 * | 9/2002 | Zenisek | ................. | B60J 3/0208 296/97.9 |
| 2004/0098917 A1 * | 5/2004 | Bourque | ................. | B60J 3/0204 49/413 |
| 2008/0217951 A1 * | 9/2008 | Aspel | ................. | B60J 3/0208 296/97.8 |
| 2013/0076058 A1 * | 3/2013 | Shin | ................. | B60J 3/0208 296/97.4 |

(Continued)

*Primary Examiner* — Gregory A Blankenship

(57) ABSTRACT

A sun visor system for selectively increasing the height of a sun visor includes a vehicle that has a sun visor. An extension unit is slidably coupled to the sun visor. The extension unit is selectively positioned in a deployed position to extend downwardly from the sun visor to block sunlight from passing beneath the sun visor. The extension unit is selectively positioned in a stored position such that the extension unit does not extend downwardly from the sun visor.

14 Claims, 5 Drawing Sheets

(56) References Cited

U.S. PATENT DOCUMENTS

2013/0320700 A1\* 12/2013 Curtis .................... B60J 3/0208
296/97.6

\* cited by examiner

SUN VISOR SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to visor devices and more particularly pertains to a new visor device for selectively increasing a height of a sun visor.

BRIEF SUMMARY OF THE INVENTION

An embodiment of the disclosure meets the needs presented above by generally comprising a vehicle that has a sun visor. An extension unit is slidably coupled to the sun visor. The extension unit is selectively positioned in a deployed position to extend downwardly from the sun visor to block sunlight from passing beneath the sun visor. The extension unit is selectively positioned in a stored position such that the extension unit does not extend downwardly from the sun visor.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
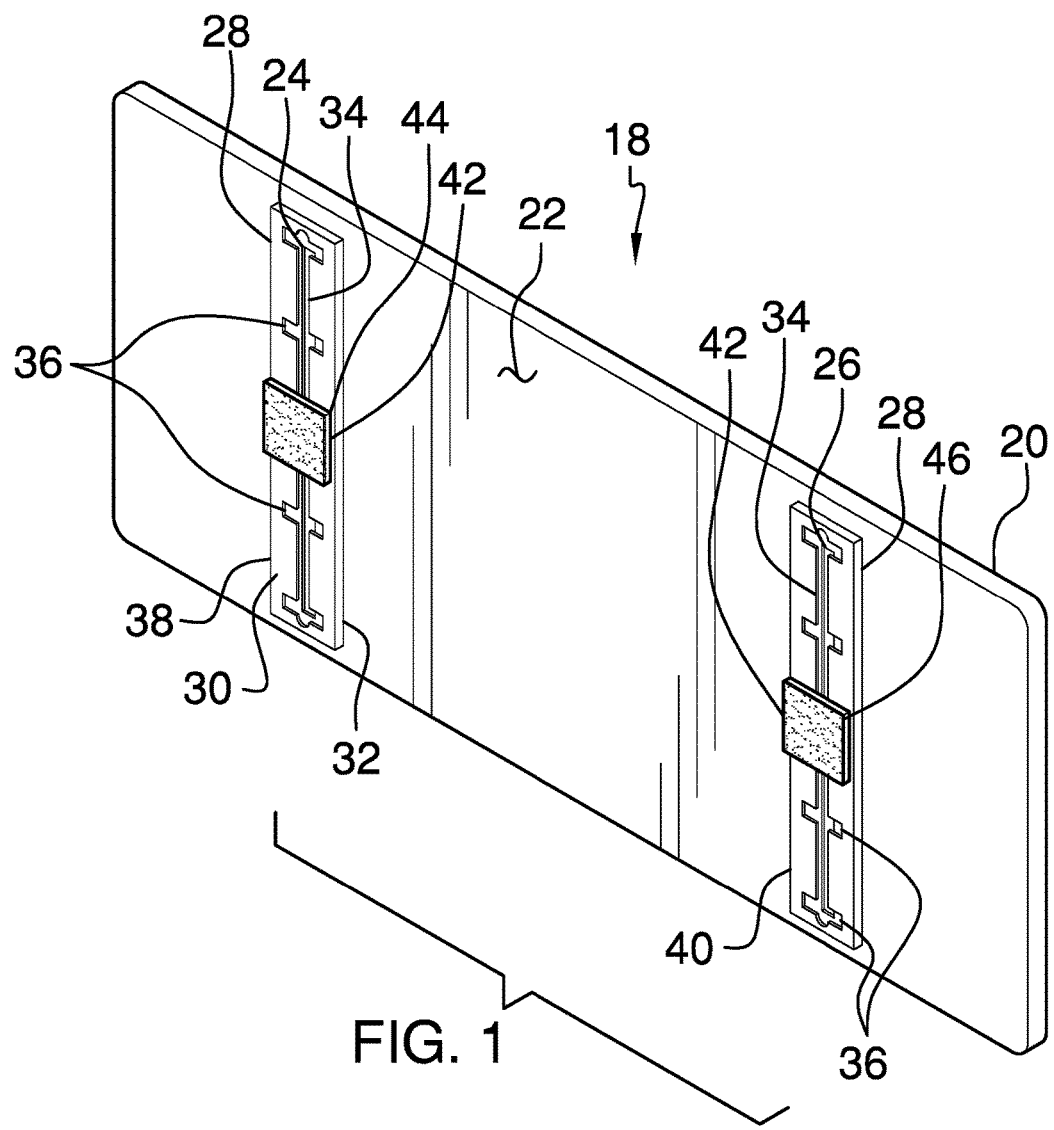
FIG. 1 is a back perspective view of a sun visor system according to an embodiment of the disclosure.
Figure 2:
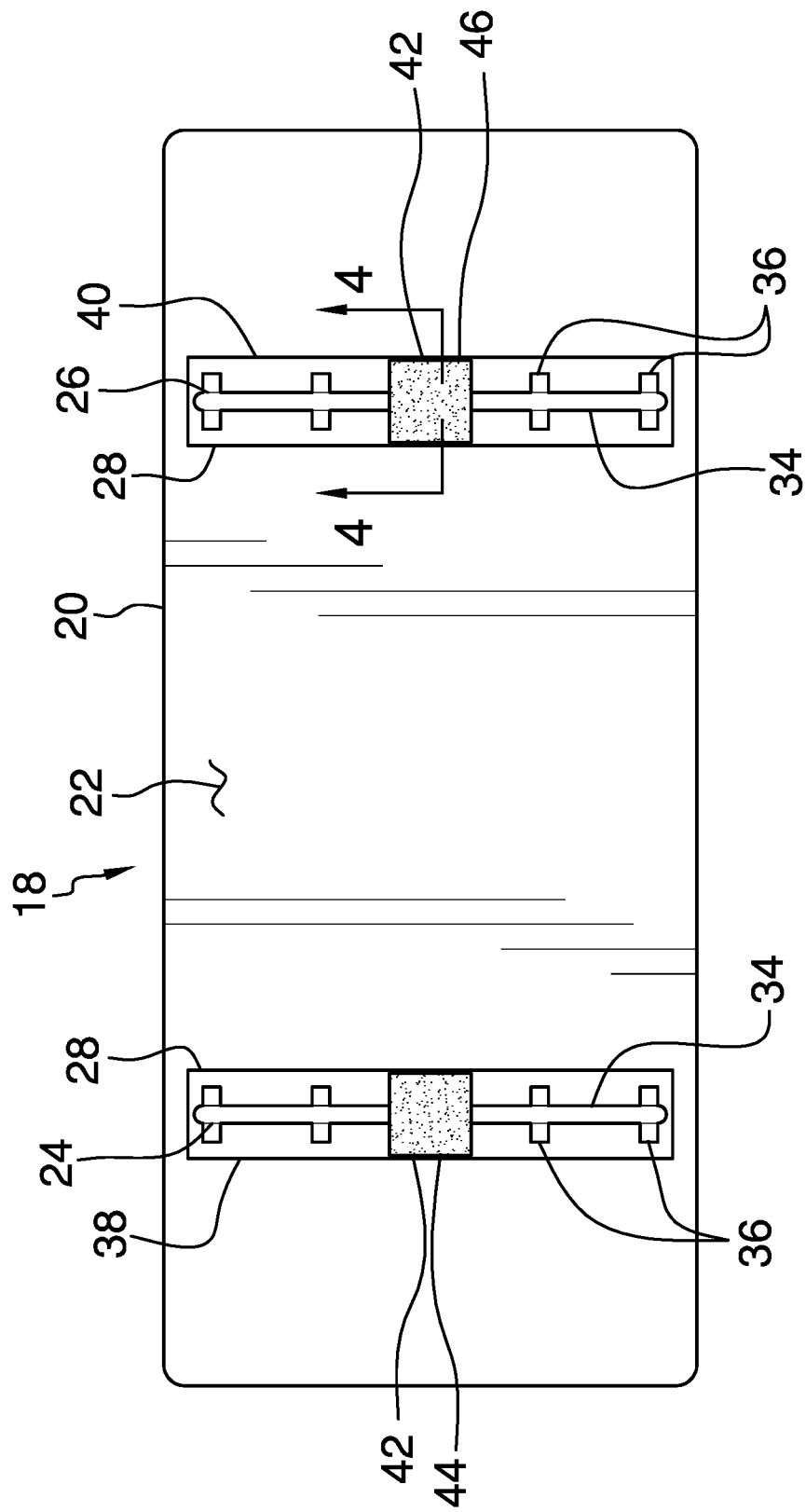
FIG. 2 is a back view of an embodiment of the disclosure.
Figure 3:
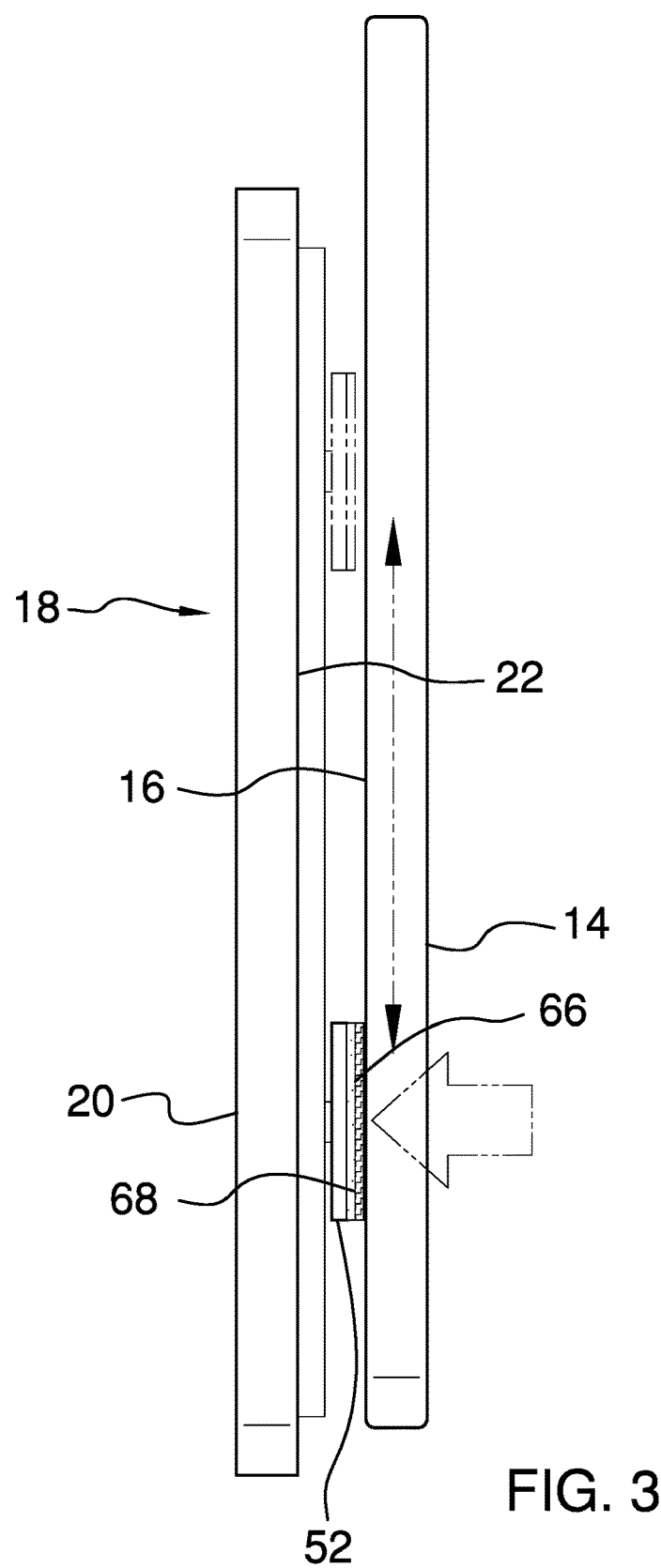
FIG. 3 is a right side view of an embodiment of the disclosure.
Figure 4:
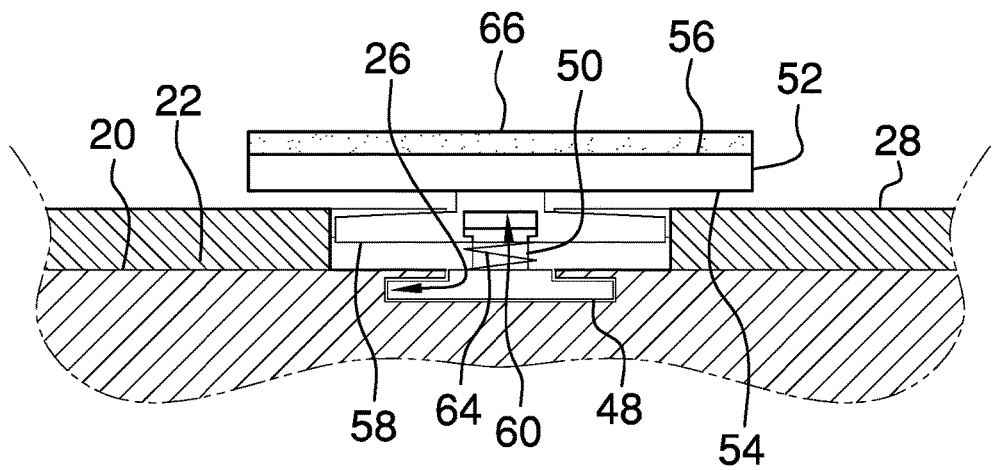
FIG. 4 is a cross sectional view taken along line 4-4 of FIG. 2 of an embodiment of the disclosure.
Figure 5:
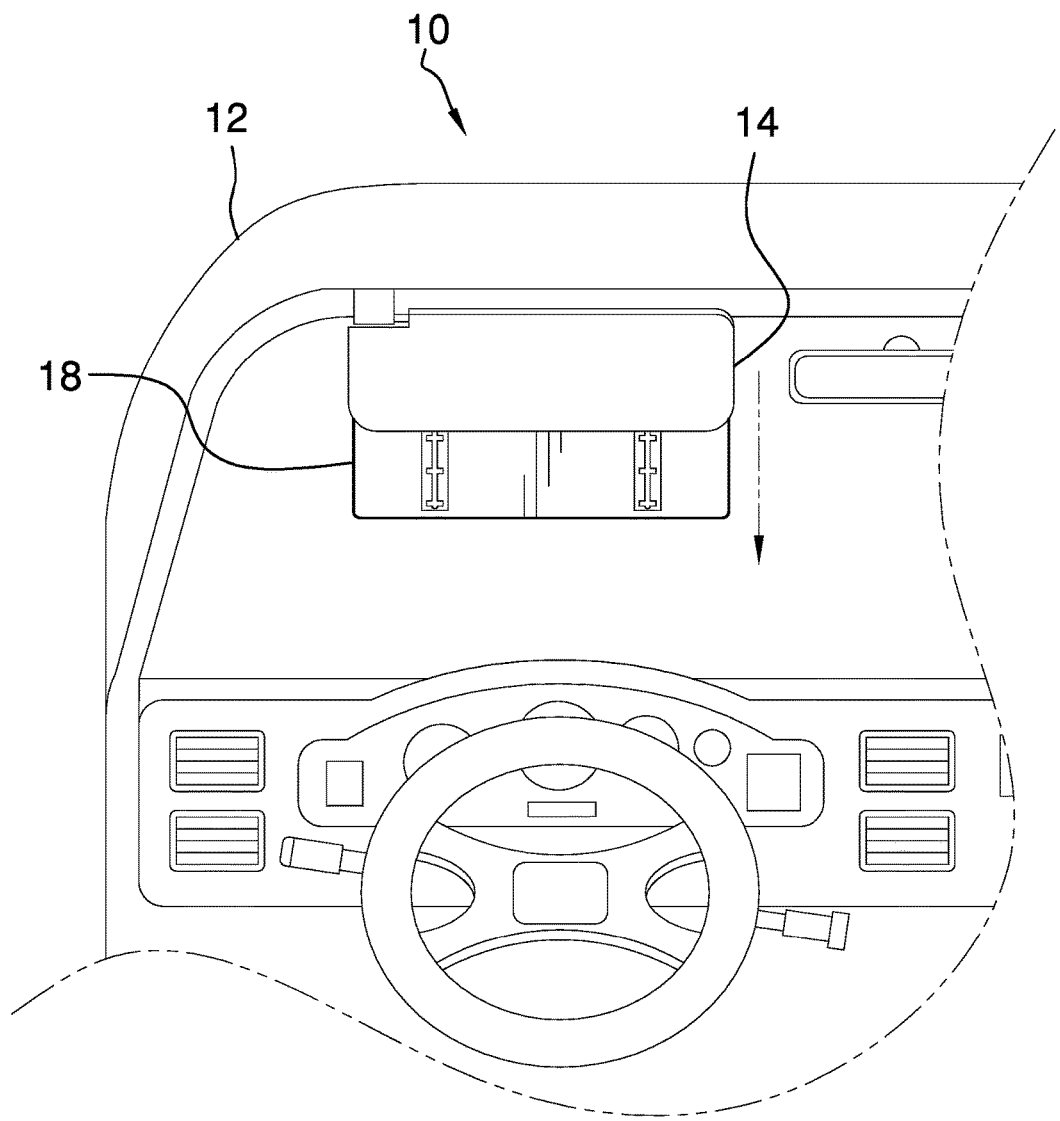
FIG. 5 is a perspective in-u se view of an embodiment of the disclosure.

With reference now to the drawings, and in particular to FIGS. 1 through 5 thereof, a new visor device embodying the principles and concepts of an embodiment of the disclosure and generally designated by the reference numeral 10 will be described.

As best illustrated in FIGS. 1 through 5, the sun visor system 10 generally comprises a vehicle 12 that has a sun visor 14 and the sun visor 14 has a primary surface 16. The vehicle 12 may be a passenger vehicle 12 or the like and the sun visor 14 may be a vehicle 12 sun visor 14 of any conventional design. An extension unit 18 is provided and the extension unit 18 is slidably coupled to the sun visor 14. The extension unit 18 is selectively positioned in a deployed position to extend downwardly from the sun visor 14. Thus, the extension unit 18 blocks sunlight from passing beneath the sun visor 14. The extension unit 18 is selectively positioned in a stored position such that the extension unit 18 does not extend downwardly from the sun visor 14.

The extension unit 18 comprises a panel 20 that has a first surface 22. A first track 24 is positioned on the first surface 22 and the first track 24 is vertically oriented. A second track 26 is positioned on the first surface 22 and the second track 26 is vertically oriented. The second track 26 is spaced from the first track 24. Additionally, each of the first 24 and second 26 tracks may comprise a slot extending into the panel 20, a pair of rails that are spaced from the panel 20 and any other mechanism facilitating a slidable coupling.

A pair of covers 28 is provided and each of the covers 28 has a first wall 30 and a perimeter wall 32 extending away therefrom. The first wall 30 corresponding to each of the covers 28 has a first slot 34 extending therethrough. Moreover, the first slot 34 is substantially coextensive with a length of the first wall 30. The first wall 30 corresponding to each of the covers 28 has a plurality of second slots 36 each extending therethrough. Each of the second slots 36 of the corresponding cover 28 is oriented perpendicular with respect to the first slot 34 of the corresponding cover 28. The second slots 36 of the corresponding cover are spaced apart from each other and are distributed along the entire length of the first slot 34 of the corresponding cover 28.

The perimeter wall 32 corresponding to each of the covers 28 is coupled to the first surface 22 of the panel 20 having the first wall 30 corresponding to each of the covers 28 being spaced from the panel 20. The pair of covers 28 includes a first cover 38 and a second cover 40. The first cover 38 is positioned over the first track 24 having the first slot 34 in the first cover 38 being oriented coextensive with the first track 24. The second cover 40 is positioned over the second track 26 having the first slot 34 in the second cover 40 being oriented coextensive with the second track 26.

A pair of slides 42 is provided and each of the slides 42 is slidably positioned in the first slot 34 of an associated one of the first 38 and second 40 covers. Each of the slides 42 is releasably coupled to the primary surface 16 of the sun visor 14. Thus, the panel 20 is slidable upwardly and downwardly on the sun visor 14. The pair of slides 42 includes a first slide 44 and a second slide 46.

Each of the first 44 and second 46 slides includes a foot 48. The foot 48 corresponding to the first slide 44 slidably engages the first track 24 and the foot 48 corresponding to the second slide 46 slidably engages the second track 26. Each of the first 44 and second 46 slides includes a peg 50 that is coupled to and extends away from the foot 48 and a plate 52 that has a first surface 54 and a second surface 56.

A member 58 is coupled to and is spaced from the first surface 54 of the plate 52. The member 58 corresponding to the first slide 44 is positioned between the first cover 38 and the first surface 22 of the panel 20. The member 58 corresponding to the second slide 46 is positioned between the second cover 40 and the first surface 22 of the panel 20. Additionally, the member 58 has a well 60 extending toward the plate 52 and the peg 50 engages the well 60 such that the plate 52 is retained on the foot 48.

A biasing member 64 is positioned around the peg 50. The biasing member 64 biases the member 58 away from the foot 48 such that the member 58 engages a selected one of the second slots 36 in an associated one of the first cover 38 and the second cover 40. In this way the plate 52 is retained at a selected point along the first slot 34 in the associated first 38 and second 40 cover. The biasing member 64 may comprise a spring or the like.

A first mating member 66 is coupled to the second surface 56 of the plate 52. A plurality of second mating members 68 is coupled to the primary surface 16 of the sun visor 14. The first mating member 66 engages an associated one of the second mating members 68 such that the corresponding slide 42 is releasably coupled to the sun visor 14. Each of the first 66 and second 68 mating members may comprise complementary hook and loop fasteners or the like.

In use, each of the second mating members 68 is attached to the primary surface 16 of the sun visor 14. The first mating member 66 corresponding to each of the slides 42 is coupled to an associated one of the second members 58. Thus, the extension unit 18 is slidably coupled to the sun visor 14. The extension unit 18 is selectively compressed against the sun visor 14 to facilitate the member 58 on each of the slides 42 to disengage the associated second slot 36. Thus, the foot 48 corresponding to each of the slides 42 may freely slide in the first 24 and second 26 tracks.

The member 58 on each of the slides 42 is allowed to engage a selected one of the second slots 36. Thus, the extension unit 18 is retained at a selected point between the deployed position and the stored position. In this way the panel 20 extends a selected distance downwardly from the sun visor 14 to facilitate shade for people of varying heights.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A sun visor system having a selectively adjustable height, said system comprising:
  a vehicle having a sun visor, said sun visor having a primary surface;
  an extension unit being slidably coupled to said sun visor, said extension unit being selectively positioned in a deployed position to extend downwardly from said sun visor wherein said extension unit is configured to block sunlight from passing beneath said sun visor, said extension unit being selectively positioned in a stored position such that said extension unit does not extend downwardly from said sun visor, said extension unit comprises
  a panel having a first surface,
  a first track being positioned on said first surface, said first track being vertically oriented, and
  a second track being positioned on said first surface, said second track being vertically oriented, said second track being spaced from said first track; and
  a pair of covers, each of said covers having a first wall and a perimeter wall extending away therefrom, said first wall corresponding to each of said covers having a first slot extending therethrough, said first slot being substantially coextensive with a length of said first wall.

2. The system according to claim 1, wherein said first wall corresponding to each of said covers has a plurality of second slots each extending therethrough, each of said second slots of said corresponding cover being oriented perpendicular with respect to said first slot of said corresponding cover, said second slots of said corresponding cover being spaced apart from each other and being distributed along the entire length of said first slot of said corresponding cover.

3. The system according to claim 2, wherein said perimeter wall corresponding to each of said covers is coupled to said first surface of said panel having said first wall corresponding to each of said covers being spaced from said panel, said pair of covers including a first cover and a second cover.

4. The system according to claim 3, wherein said first cover is positioned over said first track having said first slot in said first cover being oriented coextensive with said first track, said second cover being positioned over said second track having said first lot in said second cover being oriented coextensive with said second track.

5. The system according to claim 2, further comprising a pair of slides, each of said slides being slidably positioned in said first slot of an associated one of said covers, each of said slides being releasably coupled to said primary surface of said sun visor such that said panel is slidable upwardly and downwardly on said sun visor, said pair of slides including a first slide and a second slide.

6. The system according to claim 5, wherein each of said first and second slides comprises a foot, said foot corresponding to a first one of said slides slidably engaging said first track, said foot corresponding to a second one of said slides slidably engaging said second track.

7. The system according to claim 6, further comprising a peg being coupled to and extending away from said foot.

8. The system according to claim 7, further comprising a plate having a first surface and a second surface.

9. The system according to claim 8, further comprising a member being coupled to and being spaced from said first surface of said plate, said member corresponding to said first slide being positioned between said first cover and said first surface of said panel, said member corresponding to said second slide being positioned between said second cover and said first surface of said panel.

10. The system according to claim 9, wherein said member has a well extending toward said plate, said peg engaging said well such that said plate is retained on said foot.

11. The system according to claim 10, further comprising a biasing member being positioned around said peg, said biasing member biasing said member away from said foot such that said member engages a selected one of said second slots and associated one of said first cover and said second cover thereby retaining said plate at a selected point along said first slot in said associated first and second cover.

12. The system according to claim 8, further comprising a first mating member being coupled to said second surface of said plate.

13. The system according to claim 12, further comprising a second mating member being coupled to said primary surface of said sun visor, said first mating member engaging said second mating member such that said corresponding slide is releasably coupled to said sun visor.

14. A sun visor system having a selectively adjustable height, said system comprising:
   a vehicle having a sun visor, said sun visor having a primary surface; and
   an extension unit being slidably coupled to said sun visor, said extension unit being selectively positioned in a deployed position to extend downwardly from said sun visor wherein said extension unit is configured to block sunlight from passing beneath said sun visor, said extension unit being selectively positioned in a stored position such that said extension unit does not extend downwardly from said sun visor, said extension unit comprising:
      a panel having a first surface,
      a first track being positioned on said first surface, said first track being vertically oriented,
      a second track being positioned on said first surface, said second track being vertically oriented, said second track being spaced from said first track,
      a pair of covers, each of said covers having a first wall and a perimeter wall extending away therefrom, said first wall corresponding to each of said covers having a first slot extending therethrough, said first slot being substantially coextensive with a length of said first wall, said first wall corresponding to each of said covers having a plurality of second slots each extending therethrough, each of said second slots of said corresponding cover being oriented perpendicular with respect to said first slot of said corresponding cover, said second slots of said corresponding cover being spaced apart from each other and being distributed along the entire length of said first slot of said corresponding cover, said perimeter wall corresponding to each of said covers being coupled to said first surface of said panel having said first wall corresponding to each of said covers being spaced from said panel, said pair of covers including a first cover and a second cover, said first cover being positioned over said first track having said first slot in said first cover being oriented coextensive with said first track, said second cover being positioned over said second track having said first lot in said second cover being oriented coextensive with said second track,
      a pair of slides, each of said slides being slidably positioned in said first slot of an associated one of said first and second covers, each of said slides being releasably coupled to said primary surface of said sun visor such that said panel is slidable upwardly and downwardly on said sun visor, said pair of slides including a first slide and a second slide, each of said first and second slides comprising:
         a foot, said foot corresponding to said first slide slidably engaging said first track, said foot corresponding to said second slide slidably engaging said second track,
         a peg being coupled to and extending away from said foot,
         a plate having a first surface and a second surface,
         a member being coupled to and being spaced from said first surface of said plate, said member corresponding to said first slide being positioned between said first cover and said first surface of said panel, said member corresponding to said second slide being positioned between said second cover and said first surface of said panel, said member having a well extending toward said plate, said peg engaging said well such that said plate is retained on said foot,
         a biasing member being positioned around said peg, said biasing member biasing said member away from said foot such that said member engages a selected one of said second slots and associated one of said first cover and said second cover thereby retaining said plate at a selected point along said first slot in said associated first and second cover,
         a first mating member being coupled to said second surface of said plate, and
         a second mating member being coupled to said primary surface of said sun visor, said first mating member engaging said second mating member such that said corresponding slide is releasably coupled to said sun visor.

* * * * *